United States Patent [19]
Neitzel et al.

[11] 3,739,266
[45] June 12, 1973

[54] SYSTEM FOR SENSING VARIATIONS IN THE DIELECTRIC CONSTANT OF A FLOW OF MATERIAL

[75] Inventors: Joseph C. Neitzel, Denton, Tex.; Robert C. Strandberg, Greensboro, N.C.

[73] Assignee: Hardwicke-Etter Company, Sherman, Tex., Strandberg Engineering Laboratories, Inc., Greensboro, N.C., part interest to each

[22] Filed: Nov. 18, 1970

[21] Appl. No.: 90,604

[52] U.S. Cl. .............................. 324/61 R, 73/424
[51] Int. Cl. ....................... G01r 27/26, G01n 1/00
[58] Field of Search ..................... 324/61; 73/424

[56] References Cited
UNITED STATES PATENTS

| 1,170,842 | 2/1916 | Newhouse | 73/424 |
| 2,555,977 | 6/1951 | Kline | 324/61 R |
| 3,572,566 | 3/1971 | Fraser | 324/61 R |
| 3,012,193 | 12/1961 | Breen | 324/61 |
| 2,607,830 | 8/1952 | Razek | 324/61 |
| 3,523,243 | 8/1970 | Wagner | 324/61 |
| 3,355,665 | 11/1967 | Fegan, Jr. | 324/65 |
| 3,320,528 | 5/1967 | Esenwein | 324/61 |
| 2,540,146 | 2/1951 | Stober | 324/61 X |

FOREIGN PATENTS OR APPLICATIONS

| 173,992 | 1/1966 | U.S.S.R. | 324/61 |

Primary Examiner—Alfred E. Smith
Attorney—Richards, Harris & Hubbard

[57] ABSTRACT

The specification discloses a system for detecting the moisture content of a flow of material such as seed cotton. The system includes capacitor plates for sensing variations in the dielectric constant of the flow of material past the plates. An oscillator generates an electrical signal having a frequency proportional to the dielectric constant and circuitry is responsive to the electrical signal for generating a direct current output control signal representative of the moisture content of the flow of material. The control signal controls the temperature of a dryer system in dependency upon the average dielectric constant detected by the capacitor plates.

9 Claims, 10 Drawing Figures

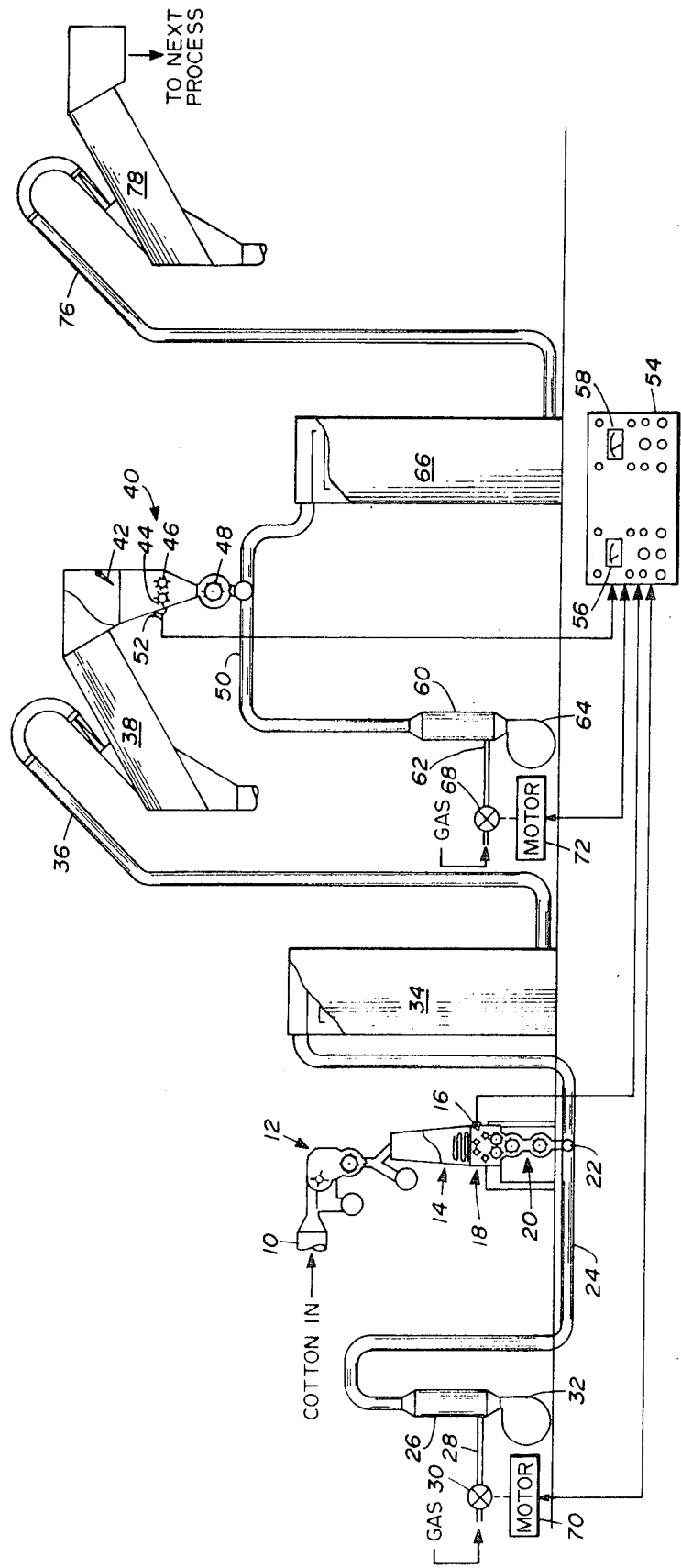
FIG. I

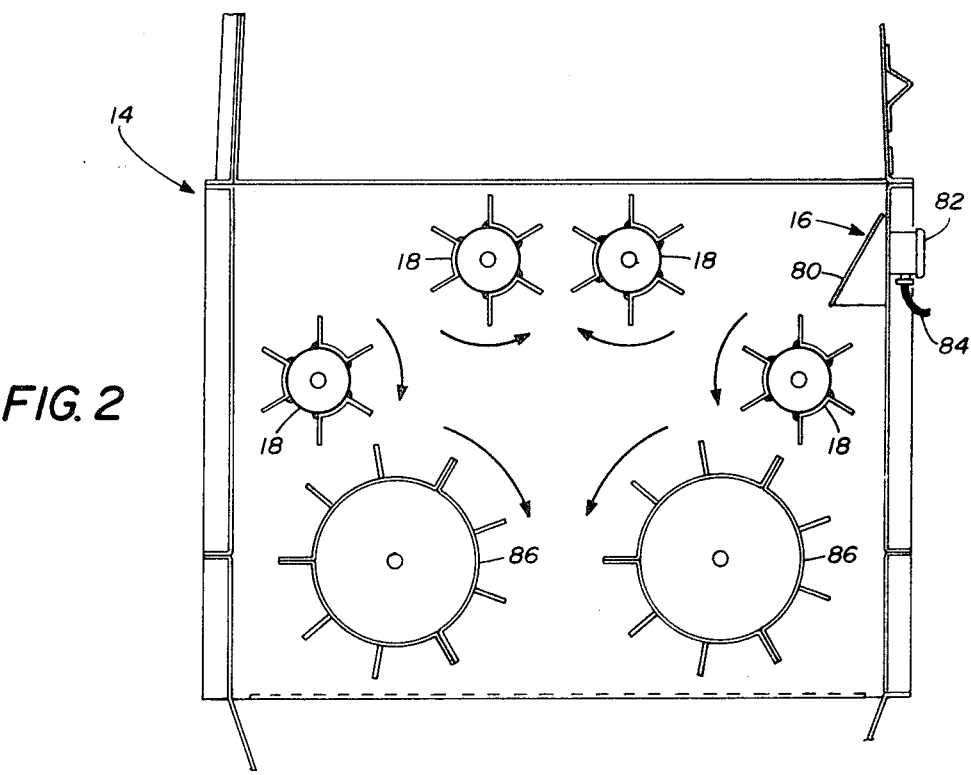
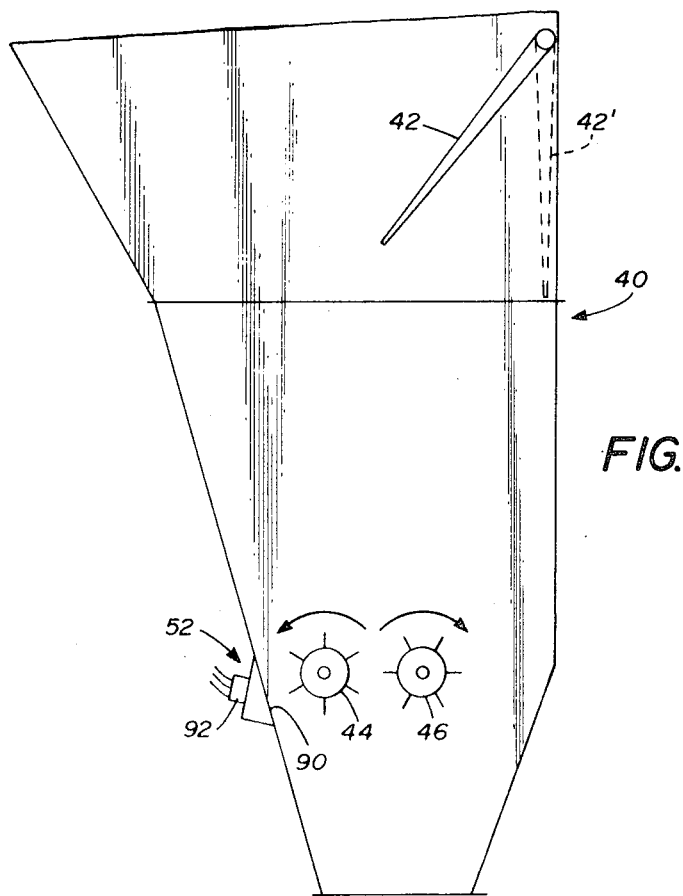

INVENTORS:
JOSEPH C. NEITZEL
ROBERT C. STRANDBERG

Richards, Harris & Hubbard
ATTORNEYS

INVENTORS:
JOSEPH C. NEITZEL
ROBERT C. STRANDBERG

Richards, Harris & Hubbard
ATTORNEYS

SYSTEM FOR SENSING VARIATIONS IN THE DIELECTRIC CONSTANT OF A FLOW OF MATERIAL

FIELD OF THE INVENTION

This invention relates to a technique for measuring the moisture content of material, and more particularly to the measurement of the moisture content of seed cotton in a gin plant to enable the reduction of the moisture content of the seed cotton to a predetermined value.

THE PRIOR ART

It is extremely important to accurately control the moisture of seed cotton during processing of the cotton in a cotton gin plant. For instance, if the moisture content of seed cotton during ginning is excessive, a decrease in the value of the ginned lint results in what is commonly termed "rough preparation." Conversely, if the seed cotton entering the gin has too low a moisture content, the staple length of the resulting fiber is shortened and the value of the end product is decreased.

Seed cotton as harvested in the fields has a moisture content ranging from 5 percent to an amount in excess of 20 percent. The ideal situation for ginning of seed cotton is to have the moisture content of the seed cotton as it enters the gin at approximately 7 percent by weight. Thus, a conventional gin plant assembly generally includes one or more dryers, in combination with one or more cleaning units, through which seed cotton is transported prior to the actual ginning operation. The temperature of the dryers is controlled in order to maintain the moisture content at or near the desired level. Heretofore, moisture measuring systems have generally been of the "resistance measuring" type and have measured the electrical conductivity of the moisture within the cotton fibers and controlled the drying of the fibers in response thereto. An example of this type of moisture control system utilizing the resistance principle is disclosed in U.S. Pat. No. 3,114,613, issued Dec. 17, 1963.

In some resistance measuring systems, relatively complex mechanical sampling structure in the form of reciprocating pistons and the like are required to periodically force samples of the seed cotton against electrical grids through which electrical current is passed. In addition to the existence of installation and maintenance problems with such prior systems, problems have also often arisen due to the fact that certain amounts of foreign matter such as grass, green leaves and the like are often interposed among the harvested seed cotton from the field. Such foreign matter often contains sufficient moisture content to introduce severe inaccuracies into the moisture measurement made by the prior systems. For example, the moisture content of a blade of grass or a single green leaf is sometimes sufficient when bridging the electrodes of a resistance detector to indicate a very low resistance indicative of a very high moisture content of the seed cotton, when actually the overall seed cotton sample may be at a relatively low moisture content. Moreover, previously developed resistance measuring systems of the type described have often required null balancing potentiometers and other mechanical devices which are subject to wear and maintenance problems.

It is also important in other industries to accurately determine the moisture content of materials such as textile fibers, cereal grains, coal and the like. Various techniques have thus been developed for sensing the moisture content of such materials, such techniques including both the above-described resistance measuring principle and the capacitance measuring principle whereby the capacitance of the material is sensed by capacitor plates. The resistance sensing techniques suffer from the problems previously described, as conductive fillers, dyes and resin in textile fibers tend to short out such resistance detectors. Additionally, resistance measuring techniques provide a nonlinear display of percent moisture content, thereby providing display problems. Resistance measuring techniques also often require individual material calibrations and are often unable to sense moisture deep within thick material such as raw stock textile, heavy pile carpeting and the like.

The capacitance measuring techniques previously utilized have also suffered from inadequacies, as many of such capacitance measuring systems have required high frequency tuned circuits and delicately balanced bridge circuits which are inherently unstable and thus provide serious drift and calibration problems. Moreover, capacitance measuring systems heretofore known have not been completely satisfactory with respect to accuracy and have often been subject to shorting of the capacitor plate due to the fact that the material being measured is allowed to physically contact the capacitor plates.

SUMMARY OF THE INVENTION

In accordance with the present invention, a system is provided to control the moisture content of seed cotton which includes structure for conveying seed cotton to a dryer. Structure electrically insulated from the seed cotton measures the average dielectric constant of a portion of the seed cotton traveling through the conveying structure. Circuitry controls the temperature of the dryer in dependency upon the average dielectric constant detected by the measuring structure.

In accordance with another aspect of the invention, a system is provided for detecting the moisture content of a flow of material which includes a device for sensing variations in the dielectric constant of the flow of material. Oscillator circuitry generates an electrical signal having a frequency proportional to the dielectric constant detected by the sensing device. Circuitry is responsive to the electrical signal for then generating a direct current output signal representative of the moisture content of the flow of material.

In accordance with yet another aspect of the invention, an insulating body is provided for mounting in proximity to a flow of material. A conducting layer is disposed on the insulating body and forms a pair of spaced apart interdigitated capacitor plates. A layer of insulation covers the capacitor plates to prevent shorting from occuring due to contact with the flow of material. Circuitry is connected across the capacitor plates for detecting variances in the dielectric constant of the flow of material past the plates.

In accordance with yet another aspect of the invention, a system is provided for detection of the moisture of a flow of material which includes a housing for receiving the flow of material. A first roller is rotated at a relatively high speed for directing a portion of the flow of material along a first path though the housing. A second roller is rotated at a relatively slow speed for directing a portion of the flow material along a second path through the housing for contacting a detector mounted on the housing. The detector measures the dielectric constant of the flow material which comes in contact therewith to provide an indication of the moisture of the flow of material.

DESCRIPTION OF THE DRAWINGS

For a more complete understanding of the present invention, and for other objects and advantages thereof, reference is now made to the following description taken in conjunction with the accompanying drawings, in which:

FIG. 1 is a somewhat diagrammatic illustration, partially broken away, of a typical seed cotton drying and cleaning assembly including the moisture sensing and control system of the present invention;

FIG. 2 is an enlarged view of a portion of the storage reservoir of the system shown in FIG. 1;

FIG. 3 is an enlarged sectional view of the control hopper shown in FIG. 1;

DESCRIPTION OF THE PREFERRED EMBODIMENT

Figure 4:
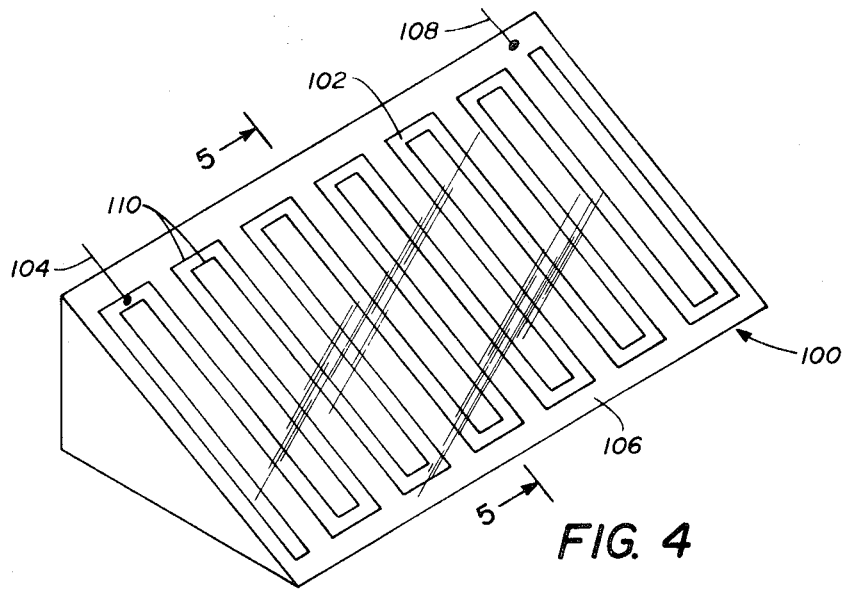
FIG. 4 is a perspective view of the preferred embodiment of the detector of the invention.

Referring to FIG. 1, a typical assembly of a cleaning and drying system for seed cotton prior to ginning is illustrated. The seed cotton is transported pneumatically through a tube 10 into a conventional separator 12 which separates the storage reservoir 14 from the moving air in conduit 10. The seed cotton falls by gravity into the storage reservoir 14 and a level control, not shown, controls the application of seed cotton through separator 12 in accordance with the amount of cotton stored within the reservoir 14. The separator 12 and the storage reservoir 14 may comprise, for instance, the automatic suction control unit manufactured and sold under the tradename STEADY-FLO by the Hardwicke-Etter Company.

A moisture detector 16 according to the present invention is mounted inside the storage reservoir 14 at a location such that seed cotton will contact the detector during normal operation of the system. A plurality of feed rollers and directional rollers 18 direct the seed cotton downwardly through a rotating vacuum member 20 to a lower blow plug 22 which communicates with a hot air line 24. A gas heater 26 receives a flow of gas through a gas line 28, the rate of gas flow being controlled by a valve 30. A fan 32 forces air through the heater 26 and through the hot air line 24 to pick up the seed cotton from the lower blow plug 22. The seed cotton is then fed into the first dryer 34. Dryer 34 is conventional and may comprise for instance the dryer sold under the mark TOWER DRYER by the Hardwicke-Etter Company.

As the cotton progresses downwardly through the first dryer 34, the cotton is opened and fluffed, and dirt, trash and other foreign matter is separated. The cotton is forced from the first dryer 34 by the flow of warm air through a hot air line 36 which supplies the cotton to the first cleaner 38. Cleaner 38 is conventional and serves to remove trash and other debris from the cotton as it travels therethrough. The hot air entraining the cotton feeds the cotton through a control hopper 40 which includes a manually adjustable baffle 42. Hopper 40 also includes a sampling roller 44 and a directional roller 46 rotated in opposite directions to feed the cotton through a blow plug 48 into a second hot air line 50. A second moisture detector 52 according to the present invention is mounted within the control hopper 40 to detect the moisture of the seed cotton traveling therethrough in a manner to be subsequently described. The outputs from the first moisture detector 16 and from the second moisture detector 52 are applied to a control console 54, wherein the percentage moisture detected by the two detectors is displayed on scales 56 and 58, respectively.

A second gas heater 60 burns gas applied through line 62. A fan 64 then blows the hot air through the hot air line 50 to entrain the seed cotton from the blow plug 48 and to carry the cotton into the second dryer 66. The amount of gas flowing through the gas line 62 is controlled by a valve 68. The console 54 contains circuitry, to be subsequently described, which detects the percentage moisture content of the cotton sensed by detectors 16 and 52 and generates control signals which control the operation of reversible motors 70 and 72. Motor 70 controls the operational valve 30 and reversible motor 72 controls the operation of the valve 68. The valves 30 and 68 may comprise any conventional adjustable orifice valve, such as the adjustable orifice valve manufactured and sold by the North American Manufacturing Company. The motors 70 and 72 may comprise any suitable electrical reversible modulating motor for driving the variable orifice valve, such as the M-944G-1030-Modutrol Motor manufactured and sold by the Minneapolis-Honeywell Company.

The second dryer 66 provides further drying action to the cotton, as well as separates trash and other debris from the cotton. Dryer 66 then supplies the cotton through a hot air line 76 to a second cleaner 78 for trash removal. Cleaner 78 further cleans the cotton and supplies the cleaned and dried cotton to the next process prior to ginning of the cotton.

In operation of the system shown in FIG. 1, detector 16 senses the dielectric constant of the seed cotton coming into contact with the detector as the seed cotton passes through the storage reservoir 14. Circuitry within the console 54 determines the percent moisture in the seed cotton which contacts detector 16. The circuitry in the console 54 compares the detected moisture content of the cotton with the position of the motor 70, and if correction is desired in the moisture content of the cotton, suitable control signals are applied to the motor 70. The output shaft of the motor 70 operates the variable orifice valve 30 to vary the amount of gas fed into the heater 26. The heat supplied by the heater 26 is thus varied to vary the amount of drying of the cotton supplied by the first dryer 34.

As previously noted, the present system is set to maintain a desired moisture content of the seed cotton of approximately 7 percent. In order to provide extremely precise control of the moisture of the seed cotton passing through the present system, the second detector 52 additionally detects the moisture content of the seed cotton passing through the control hopper 40. This second determination of the dielectric constant of the cotton passing through the system enables a more accurate sampling of the moisture content of the cotton. The output of the detector 52 is fed to circuitry within console 54 which determines the percent moisture of the cotton contacting the detector 52 and displays a percent moisture content on the scale 58. Additionally, circuitry within the console 54 compares the position of the motor 72 with the detected percent moisture of the seed cotton in the control hopper 40, and if variance of the moisture is required, signals are applied to the motor 72. The output shaft of the motor 72 is connected by a suitable linkage to control the variable orifice valve 68 to control the amount of gas fed to the burner 60. The heat supplied from the burner 60 is thus controlled to supply the desired drying action within the second dryer 66.

It will be understood that, if desired, motor 72 could be eliminated from the illustrated system and a mechanical linkage added to extend from the output of motor 70 for control of the valve 68. Additionally, in some systems, it may be desirable to utilize only a single detector and gas valve control system.

FIG. 2 illustrates in greater detail a sectional view of a portion of the storage reservoir 14 which comprises a generally rectangular chamber which receives a supply of seed cotton from the separator. The detector 16 may be seen to comprise an inclined surface 80 which contains capacitor plates and which is rigidly mounted on the interior walls of the reservoir 14. An electrical box 82 contains oscillator circuitry which is connected to the plates of the capacitor and which generates electrical signals via lead 84 to the control console 54. Four feed rollers 18 split the stream of seed cotton flowing through the storage reservoir 14 and break up any large wads of cotton. The stream of cotton is then fed downwardly into the vacuum portion of the system by a pair of directional rollers 86. The inclined position of the surface 80 is important in that a generally continuous supply of seed cotton will pass in contact with the detector 16, without obstructing the flow of seed cotton through the storage reservoir. The positioning of the detector 16 in the storage reservoir 14 assures that a generally continuous supply of seed cotton contacts seed detector 16 to enable adequate sampling of the flow of cotton through the system.

FIG. 3 illustrates a sectional view of the control hopper 40 which comprises a hopper for accumulation of the cotton prior to application to the second dryer 66. The detector 52 is rigidly mounted within a wall of the hopper 40, such that an inclined surface 90 of the detector contacts a portion of the stream of cotton through the hopper. The baffle 42 may be manually positioned from outside the hopper 40 to assure that an adequate supply of the seed cotton comes in contact with the detector 52 at all times. The position of the baffle 42 may be moved to the dotted line position 42' at relatively high flow rates of cotton through the system. Electrical control box 92 is attached to the rear of the detector 52 and contains oscillator circuitry which generates signals having frequencies proportional to the dielectric constant of the cotton contacting the detector 52.

An important aspect of the control hopper 40 includes the rollers 44 and 46. Roller 46 is rotated at relatively high speeds in the range of 100 to 500 rpm in the clockwise direction to direct the main portion of the flow of seed cotton through the control hopper to the lower blow plug 48. The sampling roller 44 is rotated at a relatively low speed of from 4–10 rpm in the counterclockwise direction to supply a generally continuous portion of the cotton past the detector 52 to enable sampling of the moisture of the cotton. The speed differentials between the rollers 44 and 46 has been found to work well in providing a continuous and relatively fast flow of cotton through the control hopper 40, while providing adequate sampling of the moisture content of the cotton by the detector 52. Again, the inclined nature of the surface 90 enables accurate sampling of the seed cotton without providing a serious obstruction to the flow of cotton therethrough.

FIG. 4 is a perspective view of a moisture detector according to the invention. The detector includes a surface 100 which is adapted to be inclined to the flow of cotton through a reservoir or hopper. A first capacitor plate 102 is defined on the surface 100 and includes an electrode 104 connected thereto. A second capacitor plate 106 is defined on the surface 100 and includes an electrode 108 connected thereto. Capacitor plates 102 and 106 are constructed from a layer of conductive metal such as copper and are separated by a narrow groove 110 to define a pair of interdigitated capacitor plates. Surface 100 is covered with a layer of insulating material such that the seed cotton flowing therepast does not electrically contact either of the conductive capacitor plates.

Figure 5:
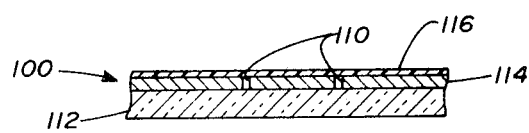
FIG. 5 is a sectional view of a portion of the detector shown in FIG. 4 taken along section lines 5—5.

FIG. 5 illustrates a sectional view taken along section lines 5—5 of the inclined surface 100. The structure comprises an insulation layer 112 which may comprise a fiberglas sheet or printed circuit board material. A metallic layer 114 is then applied uniformly over the insulating layer 112. The groove 110 is then defined in the metallic layer 114 by suitable photoresist etching methods commonly used in printed circuit techniques. After the groove 110 is formed in the conductive layer 114, the spaced apart interdigitated capacitor plates 102 and 106 have been defined. The electrodes 104 and 108 are then attached and a layer of insulation 116, such as urethane, is then applied over the total exterior surface of the inclined surface 100.

Due to the interdigitated or overlapping configuration of the capacitor plates 102 and 106 formed upon the planar surface, a highly sensitive capacitor may be constructed in a relatively compact manner. Due to the interdigitated configuration of the capacitor plates 102 and 106, an averaging effect of the seed cotton contacting the entire surface 100 is obtained, thereby providing excellent detection characteristics. As the entire surface 100 is covered with an insulating layer 116, the present detector is virtually insensitive to green leaves or other trash contained within the seed cotton mass and is also relatively insensitive to water condensate which may form on the detector surface during rapid temperature changes.

Figure 6:
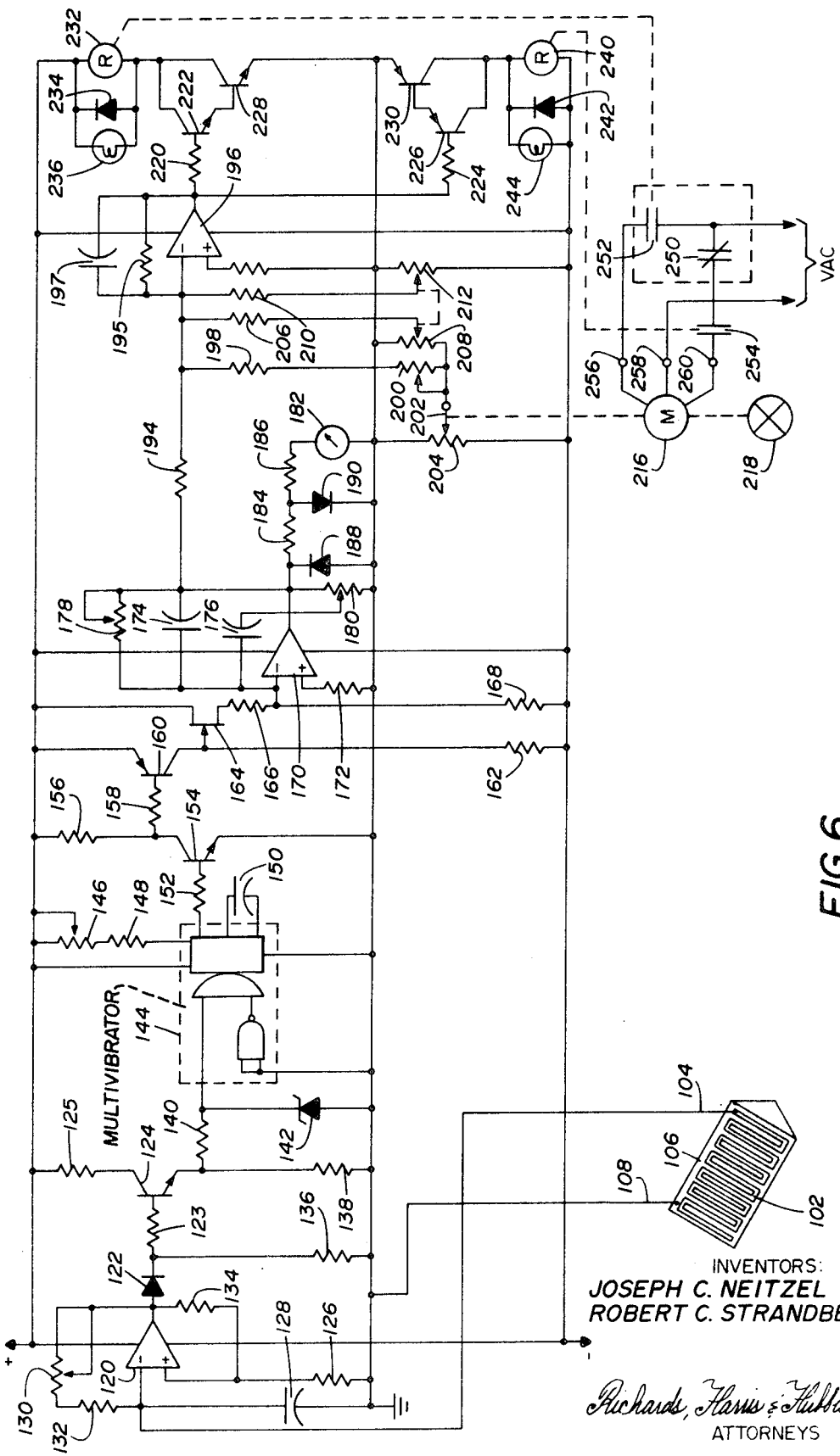
FIG. 6 is a schematic diagram of the detection circuitry of the present invention.

FIG. 6 illustrates in schematic detail the moisture control circuitry which is connected to the electrodes 104 and 108 of the detector. Electrode 104 is connected to an input of an operational amplifier 120, the output of which is applied through a diode 122 and resistor 123 to the base of a transistor 124. Resistor 123 serves to limit the output current of amplifier 120 through diode 122. The resistor 125 limits the collector current of transistor 124. The electrode 108 connected to the capacitor plate 106 is applied to circuit ground and is further applied through a resistance 126 to the second input of the operational amplifier 120. A suitable operational amplifier for use with the invention is an LM301A amplifier manufactured and sold by National Semiconductor Company. The electrode 108 is also connected through a capacitance 128 to the negative terminal of the operational amplifier 120. An adjustable resistor 130 is connected in series with a resistance 132 across the amplifier 120 to enable frequency calibration thereof. A resistor 134 is also connected between the positive input of the amplifier 120 and the output thereof.

The amplifier 120 and the associated circuitry therewith comprise a relatively low frequency oscillator circuit, the output of which is a signal having a frequency dependent upon the value of the capacitance of the present detector. The capacitance of the detector will in turn be determined by the dielectric constant of the cotton in contact therewith. The output of the oscillator circuitry is thus a square wave train having a frequency of $$f = \frac{1}{2(R_{132}+R_{130})(C_1+C_{128})\ln\left(1+\frac{2R_{126}}{R_{134}}\right)} \quad (1)$$

wherein $C_1$ = the capacitance of the present detector in farads.

In an embodiment of the invention which worked well in practice, the output frequency of the oscillator was set to 1,000Hz. The oscillator output from the amplifier 120 is approximately 10 volts peak-to-peak and is rectified by the diode 122 to eliminate the negative portion of the signal. The resultant signal of 5 volts peak-to-peak appears across a resistance 136 which tends to limit the output current of the amplifier 120 in the event of an accidental short circuit during wiring of the present detector.

The transistor 124 is connected in an emitter follower configuration and applies an output to an emitter follower resistor 138. The connection between the emitter of transistor 124 and the resistor 138 is normally a long cable length of 50-200 feet which connects with the control console 54 of the system. The output signal is applied through a resistor 140 and a Zener diode 142 which provides input protection for an integrated circuit monostable multivibrator 144. Monostable multivibrator 144 is conventional and will not thus be described in detail, and may comprise for instance the integrated circuit device SN74121N manufactured and sold by Texas Instruments Incorporated. Resistors 146 and 148 are connected between a source of positive voltage supply and the monostable multivibrator 144. Resistor 146 is adjustable to provide a low calibration function.

The monostable multivibrator 144 generates a fixed width output pulse upon the occurrence of each positive transition of the input signal from the detector. The width of the pulses generated by the monostable multivibrator 144 is controlled by the values of resistors 146 and 148 and also by the value of a capacitor 150 connected thereto. The expression for the pulse width generated by the multivibrator 144 is:

$$T = (R_{146} + R_{148})C_{150} \quad (2)$$

wherein T is expressed in seconds, $C_{150}$ in farrads, and $R_{146}$ and $R_{148}$ in ohms.

The output from the multivibrator 144 is fed via a current limiting resistor 152 to the base of a transistor 154. Transistor 154 operates as an invertor and a resistor 156 operates as a collector load for transistor 154. The inverted signal is fed through a current limiting resistor 158 to the base of a transistor 160. Transistor 160 also acts as an inverter, and has its collector load resistor 162 connected to the source of negative bias voltage. This connection provides for an output voltage swing at the collector of transistor 160 from nearly positive to negative voltage supply magnitudes to insure proper driving of the gate of a field effect transistor 164.

Transistor 164 serves as a precision switch to connect a resistor 166 to the supply of positive bias voltage during each output pulse from the monostable multivibrator 144. A resistor 168 is connected to resistor 166 and both resistors are connected to the negative input of an operational amplifier 170. The fixed resistance 172 is connected between circuit ground and the noninverting input of the amplifier 170. A capacitor 174 is connected across the amplifier 170. A capacitor 176 is connected from the inverting input of amplifier 170 to the wiper of a potentiometer 180. A potentiometer 180 is connected across the output of the amplifier 170. The setting of resistor 178 provides for initial calibrations of the present system to the actual value of moisture in cotton, as separately determined by a suitable portable moisture measuring device.

The amplifier 170 and its associated circuitry comprises a difference integrator which converts the square-wave input current through resistance 166 to a ripple-free D-C output. The fixed negative D-C input current through resistor 168 is not affected by the capacitance 174 and 176, except for initial damping when power is initially applied to the circuit. After this initial damping, the negative D-C input through resistance 168 balances the average positive input current through resistance 166 to establish a zero meter reading of a meter 182 connected through resistances 184 and 186 to the output of the integrator amplifier 170. A pair of diodes 188 and 190 are also connected across the output of the amplifier 170 to provide protection for meter 182 which might occur due to inappropriate adjustments of calibrations of the system.

In effect, the difference integrator of the circuit subtracts the currents applied through resistances 166 and 168, the current flowing through resistances 168 comprising a negative reference current, and integrates the difference between the two currents through integrating capacitors to provide a direct current output. When no cotton is applied to the present detector of the system, the output of the amplifier 170 will thus be zero and meter 182 will read zero. When cotton contacts the detector, the average current through resistance 166 will be great enough to cause a deflection of the meter 182, which will provide a linear indication of the percent moisture of the cotton. The variable resistance 180 and the capacitor 176 provide a damping circuit to reduce excessive meter movement. The output from amplifier 170 is applied through a resistor 194 to the inverting input of amplifier 196, which is identical to amplifier 120. A resistor 195 and a capacitor 197 are connected from the inverting input of amplifier 120 and the output thereof. Resistor 195 determines the gain of the amplifier 196 and hence the dead zone of the comparator of the system. Capacitor 197 serves to filter out any noise pickup that might originate in the wiring of the system. A resistor 198 is also connected to the inverting input of amplifier 196 and is connected through an adjustable resistance 200 to a movable arm 202 of a retransmitting potentiometer 204.

Potentiometer 204 is connected between circuit ground and a source of negative voltage supply. A resistance 206 is connected to the inverting input of the amplifier 196 and through an adjustable resistance 208 to the movable arm 202. Likewise, a resistor 210 is connected between the inverting input of amplifier 196 and to the movable arm of a variable resistance 212 connected between circuit ground and the source of negative voltage potential. The movable arms of the adjustable resistances 208 and 212 are coupled together so that adjustments of these resistors provide an automatic low level limit to the present system. The adjustment of resistor 200 provides an automatic high limit to the system.

Movable arm 202 of the potentiometer 204 is connected by a suitable mechanical linkage to the output of a reversible motor 216. The output of motor 216 is mechanically coupled to a variable orifice valve 218 located in a gas flow line. Amplifier 196 serves as a high-gain comparator without hysteresis. The amplifier compares the output from the amplifier 170 with the current input generated in response to the position of the output shaft of the motor 216. The position of the motor 216 moves the movable arm 202 to affect the magnitude of the negative current applied through resistors 198, 200, 206, 208, 210 and 212. The current through resistor 194 is positive and thus positive currents tend to balance the negative current flow indicative of the output position of the motor 216. By adjusting the gauged potentiometers 208 and 212 to provide a low limit and by adjusting the resistor 200 to provide a high limit, the rotational limits of the motor 216 may be set within a known range of percent moisture content.

The setting of the high and low limitations of the circuit are arranged in a self-compensating manner so that the adjustment of one of the potentiometers is independent of the other, such that adjustment of one of the potentiometers does not alter the setting of the other potentiometer. The output of the amplifier 196 has three possible output states ranging from zero output, and plus and minus voltage outputs. For zero voltage output, no operation of the motor 216 is provided. The output of amplifier 196 is connected through a resistance 220 to the base of a transistor 222 and through a resistance 224 to the base of transistor 226. Transistor 222 is connected in a Darlington configuration with a transistor 228, while transistor 226 is connected in a Darlington configuration with a transistor 230. The emitters of transistors 228 and 230 are commonly connected to circuit ground. The collector of transistors 222 and 228 are commonly connected to one terminal of a relay 232. A diode 234 is connected across relay 232 and a light 236 is also connected across relay 232.

The collectors of transistors 226 and 230 are commonly connected to one terminal of a relay 240. A diode 242 and a light bulb 244 are connected in parallel across the relay 240. The relay 232 controls the operation of a normally closed contact 250 and a normally open contact 252. The output of relay 240 controls the operation of a normally open relay 254. A decrementing terminal 256 of motor 216 is connected through the normally open contact 252 to a source of positive A/C voltage. The common terminal 258 of the motor 216 is connected directly to a source of A/C voltage potential. The incrementing electrode or terminal 260 of the motor 216 is connected through a normally open contact 254, and the normally closed contact 250 to the source of positive A/C voltage.

In operation of the system when a zero voltage output is provided from the amplifier 196, neither of the driver transistor pairs 222 and 228 or 226 and 230 will be turned on. Additionally, neither relay 232 or 240 will be energized and the motor 216 will be stopped and no control of the gas flow through valve 218 is provided. However, when the output voltage from amplifier 196 is positive, transistors 222 and 228 are turned on and relay 232 is energized. Relay contact 252 is then closed and relay contact 250 is opened so that current is applied through the decrementing terminal 256 of the motor 216 to slowly rotate the output shaft on the motor 216 to close the valve 218. The potentiometer arm 202 is then repositioned along the potentiometer 204 to reset the system.

When the output voltage from the amplifier 196 is negative, transistors 226 and 230 are turned on, thereby turning relay 240 on and closing relay contact 254 to supply current through incrementing electrode 260 and the motor 216. The output shaft of the motor 216 will then turn to open the valve 218 and to reposition the potentiometer 202. When relay 232 is turned on, light 236 is energized to indicate that the system is closing the valve. Alternatively, when relay 240 is turned on, light 244 is energized to indicate that the system is opening the valve 218. Diodes 234 and 242 are included to provide a return path for the circulating current in the inductive coils of the relays 232 and 240 when the driver transistors are turned off.

Figure 7A:
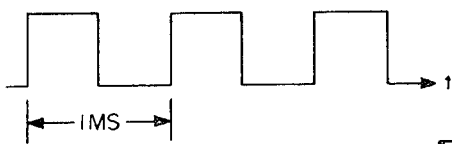
FIGS. 7a–7d are an illustration of timing waveforms for various portions of the circuitry shown in FIG. 6 during operation thereof.
Figure 7B:
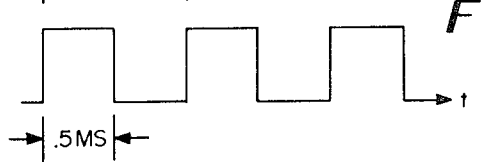
Figure 7C:
Figure 7D:
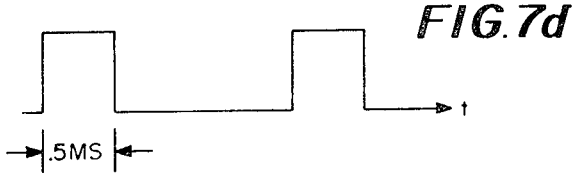

FIGS. 7a–d illustrate various waveforms of the present system during operation, FIG. 7a illustrates the output from amplifier 120 when no cotton is contacting the present detector. The frequency illustrated is 1,000Hz. FIG. 7b represents the output from the multivibrator 144 with no cotton touching the present detector, wherein it may be seen that the frequency from the multivibrator is identical to that from the amplifier 120. When wet of moist cotton contacts the detector surface, the detector output frequency from amplifier 120 decreases since the dielectric constant of the wet cotton is higher, as is shown in FIG. 7c. The multivibrator 144 is thus triggered less often, as shown in FIG. 7d. However, the output from the multivibrator 144 still comprises pulses of the same width, but spaced further apart than the mode of operation as shown in FIG. 7b, when no cotton contacts the present detector.

Since the multivibrator produces fewer pulses per unit time when wet cotton contacts the detector surface, the average value of the positive current applied from the multivibrator 144 through resistor 166 will decrease. Thus, a net negative input current is fed to the amplifier 170 due to the fixed flow of current through resistor 168. The output of the amplifier 170 will thus swing positive due to the fact that the integrator inverts the polarity of its average input current. The magnitude of the positive output voltage from the amplifier 170 is directly proportional to the moisture content of the cotton and deflects the meter 182. It is important to note that the present system provides a linear output for meter 182, instead of the hard-to-read and calibrate nonlinear output provided by prior resistance measuring circuits.

While the present circuit has been described with respect to specific embodiments of operational amplifiers and a monostable multivibrator, it will be understood that other systems utilizing inverse pulse-width to D-C voltage conversion may also be used to control the motor 216 in response to the detector output.

Additionally, while the present system has been primarily described for use in moisture control of seed cotton, the present system is equally adaptable for use in the measurement of dielectric constants of textiles and other conductive material such as coal and the like. An advantage of the present system for use with conductive materials is that a system detector can not be shorted out by the conductor materials due to the insulating layer applied over the detector. The present system is advantageous in that no high-frequency tuned circuits or delicately balanced bridge circuits are required. When the present system is utilized as a textile moisture control, the system may be used to alter the speed of processing and drying machines rather than physically altering the heat applied to the textiles.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A system for detecting the moisture content of a flow of seed cotton comprising:
    a housing for receiving a gravity flow of seed cotton,
    means in said housing for sampling a minor portion of said gravity flow of seed cotton,
    sensing means mounted in said housing for sensing the dielectric constant of the sampled minor portion of said gravity flow of seed cotton, said sensing means having an electrical characteristic which varies in response to variations in the dielectric constant of the flow of seed cotton,
    oscillator circuitry responsive to said sensing means for generating an electrical signal having a frequency proportional to the dielectric constant detected by said sensing means, and
    generating means responsive only to said electrical signal for generating a direct current output signal representative of the present moisture content of the flow of seed cotton.

2. The system of claim 1 wherein said generating means comprises:
    means responsive to said oscillator circuitry for generating a pulse train of constant pulse width and having a frequency proportional to the frequency of said electrical signal, and
    means for comparing the time averaged amplitude of said pulse train with the amplitude of a reference voltage and for generating a direct current signal representative of the difference between said amplitudes.

3. The system of claim 2 wherein said means for comparing comprises a difference integrator.

4. The system of claim 2 and further comprising:
    meter means for displaying said direct current signal to indicate the moisture content of said flow of seed cotton.

5. The system of claim 1 wherein said sensing means comprises:
    an insulating body mounted in proximity to the flow of seed cotton,
    a conducting layer disposed on said insulating body,
    a groove formed in said conducting layer to form a pair of spaced apart interdigitated capacitor plates,
    a layer of insulation covering said plates, and
    oscillator circuit means connected across said plates for generating an output signal having a frequency proportional to variances in the dielectric constant of the flow of seed cotton past said plates.

6. The system of claim 5 wherein said interdigitated capacitor plates are mounted on a block having a triangular cross section, said block disposed on a planar surface disposed at an angle relative to the flow of seed cotton.

7. The system of claim 5 and further comprising:
    means for deflecting a portion of said flow of seed cotton into contact with said layer of insulation covering said plates.

8. In a system for detecting the moisture of a generally vertical gravity flow of seed cotton, the combination comprising:
    a housing for receiving said generally vertical gravity flow of seed cotton,
    first roller means rotated in one direction about a generally horizontal axis at a relatively high speed for directing the main portion of said flow of seed cotton along a first path through said housing,
    second roller means rotated at a relatively slow speed in a second direction about a generally horizontal axis generally parallel to the rotational axis of said first roller means for directing a minor portion of said flow of seed cotton along a second path through said housing, said first and second paths being directed along different portions of said housing at different speeds, and
    detector means adjacent said second path for measuring the dielectric constant of said flow of seed cotton.

9. The system of claim 8 wherein said detector means comprises:
    a pair of spaced apart interdigitated capacitor plates disposed on a planar surface disposed at an angle to said flow of seed cotton.

* * * * *